(12) United States Patent
Nagao

(10) Patent No.: US 9,603,431 B2
(45) Date of Patent: Mar. 28, 2017

(54) NAIL DESIGN DEVICE, NAIL PRINTING APPARATUS, NAIL DESIGN METHOD, AND COMPUTER-READABLE RECORDING MEDIUM STORING NAIL DESIGN PROGRAM

(71) Applicant: CASIO COMPUTER CO., LTD., Tokyo (JP)

(72) Inventor: Tomoyuki Nagao, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/859,823

(22) Filed: Sep. 21, 2015

(65) Prior Publication Data

US 2016/0088917 A1    Mar. 31, 2016

(30) Foreign Application Priority Data

Sep. 26, 2014    (JP) .................................. 2014-196264

(51) Int. Cl.
  *G06K 15/22*    (2006.01)
  *A45D 29/00*    (2006.01)
       (Continued)

(52) U.S. Cl.
  CPC ......... *A45D 29/00* (2013.01); *G06K 9/00375* (2013.01); *G06K 9/46* (2013.01);
       (Continued)

(58) Field of Classification Search
  None
  See application file for complete search history.

(56) References Cited

U.S. PATENT DOCUMENTS 4,561,850 A * 12/1985 Fabbri .................. A45D 44/005
                                                          434/100
6,286,517 B1 * 9/2001 Weber .................... A45D 29/00
                                                          132/200
(Continued)

FOREIGN PATENT DOCUMENTS

JP          2656203 B2       9/1997
JP       2001-101272 A       4/2001
       (Continued)

OTHER PUBLICATIONS

David Kappos, Subject Matter Eligibility of Computer Readable Media, Feb. 23, 2010, USPTO, 1351 OG 212.*

*Primary Examiner* — Ted Barnes
(74) *Attorney, Agent, or Firm* — Scully, Scott, Murphy & Presser, P.C.

(57) ABSTRACT

A nail design device which allows a user to more easily select one of a plurality of nail designs that fits the shape of a nail, a nail printing apparatus which includes the nail design device and performs drawing on a nail, a nail design method, and a computer-readable recording medium storing a nail design program are provided.
The nail printing apparatus 10 includes an analyzing unit 62 which derives a feature quantity of a nail based on a shape of the nail from an image including the nail, a judging unit 63 which judges whether at least one of a plurality of nail designs is suitable for the nail on the basis of a comparison between the feature quantity and design data, the design data being corresponding to the plurality of nail designs, and a display control unit 60 which causes at least one of the plurality of nail designs that has been judged to be suitable for the nail by the judging unit 63, to be displayed highlighted on a display unit 32 as a fitting nail design.

17 Claims, 9 Drawing Sheets

(51) Int. Cl.
*G06K 9/00* (2006.01)
*H04N 5/225* (2006.01)
*G06K 9/46* (2006.01)
*G06K 9/62* (2006.01)

(52) U.S. Cl.
CPC ........... *G06K 9/6201* (2013.01); *H04N 5/225* (2013.01); *A45D 2029/005* (2013.01)

(56) References Cited

U.S. PATENT DOCUMENTS

| | | | | |
|---|---|---|---|---|
| 2002/0014248 | A1* | 2/2002 | Gamburg | A45D 29/001 132/200 |
| 2004/0143359 | A1* | 7/2004 | Yogo | A45D 31/00 700/161 |
| 2006/0055825 | A1* | 3/2006 | Shiota | G06F 17/30247 348/563 |
| 2007/0258655 | A1* | 11/2007 | Motominami | H04N 1/0035 382/254 |
| 2009/0086044 | A1* | 4/2009 | Kinemura | G11B 27/105 348/220.1 |
| 2010/0135597 | A1* | 6/2010 | Gokturk | G06F 17/3025 382/305 |
| 2012/0198381 | A1* | 8/2012 | Kumamoto | G06F 17/212 715/781 |
| 2012/0287183 | A1* | 11/2012 | Bitoh | A45D 29/00 347/3 |
| 2012/0287192 | A1* | 11/2012 | Yamasaki | B41J 3/4073 347/14 |
| 2013/0038648 | A1* | 2/2013 | Kasahara | B41J 3/407 347/2 |
| 2013/0057866 | A1* | 3/2013 | Hillebrand | A45D 44/005 356/421 |
| 2013/0058543 | A1* | 3/2013 | Thomas | A45D 44/005 382/118 |
| 2013/0236074 | A1* | 9/2013 | Hillebrand | A45D 44/005 382/128 |
| 2013/0247929 | A1* | 9/2013 | Namai | A45D 29/00 132/200 |
| 2014/0311625 | A1* | 10/2014 | Bartholomew | A45D 29/00 141/69 |
| 2015/0170377 | A1* | 6/2015 | Thomas | A45D 44/005 382/165 |
| 2016/0037159 | A1* | 2/2016 | Hillebrand | A45D 44/005 348/77 |
| 2016/0125624 | A1* | 5/2016 | Liu | G06K 9/00281 345/593 |

FOREIGN PATENT DOCUMENTS

| | | |
|---|---|---|
| JP | 2001-319035 A | 11/2001 |
| JP | 2003-534083 A | 11/2003 |
| WO | 2014/087621 A1 | 6/2014 |

* cited by examiner

FIG. 6

| NUMBER | NAIL DESIGN D | JUDGMENT STANDARD DATA | | |
|---|---|---|---|---|
| | | ASPECT RATIO (H/W) | NAIL LENGTH H | AREA RATE R IN CIRCUMSCRIBED QUADRANGLE |
| No.01 | D1 | 1.0 OR MORE | ALL | 80% OR MORE |
| No.02 | D2 | ALL | ALL | ALL |
| No.03 | D3 | 1.0 OR LESS | 5mm OR MORE | ALL |
| ⋮ | ⋮ | ⋮ | ⋮ | ⋮ |

NAIL DESIGN DEVICE, NAIL PRINTING APPARATUS, NAIL DESIGN METHOD, AND COMPUTER-READABLE RECORDING MEDIUM STORING NAIL DESIGN PROGRAM

CROSS-REFERENCE TO RELATED APPLICATIONS

This application is based upon and claims the benefit of priority from the prior Japanese Patent Application No. 2014-196264, filed Sep. 26, 2014, the entire contents of which are incorporated herein by reference.

BACKGROUND OF THE INVENTION

1. Field of the Invention

The present invention relates to a nail design device, a nail printing apparatus, a nail design method, and a computer-readable recording medium which stores a nail design program.

2. Description of the Related Art

A nail printing apparatus configured to draw a nail design on a fingernail has conventionally been proposed.

For example, Published Japanese Translation of PCT Application No. 2003-534083 describes a technique for a nail printing apparatus which uses inkjet printing technology to apply a nail design on a fingernail or a toenail.

Generally, in a nail printing apparatus, for printing a nail design on a nail, a nail region on which the design is to be applied is detected, and the aspect ratio and scaling factor of the design are modified in accordance with the detected region, such that the design is printed to match the nail size. Some nail designs, however, have been designed to fit particular nail shapes.

In the case of asking a manicurist to draw a design on a nail, the manicurist determines the design in accordance with the shape of the nail. On the other hand, in the case of using a nail printing apparatus, a user needs to find one of a plurality of nail designs that fits the shape of the nail on which the design is to be drawn. Finding a nail design that fits a certain nail shape is a troublesome task.

In view of the foregoing, an object of the present invention is to provide a nail design device which allows a user to more easily select one of a plurality of nail designs that fits the shape of the nail on which the design is to be drawn, a nail printing apparatus which includes the nail design device and performs drawing on a nail, a nail design method, and a computer-readable recording medium which stores a nail design program.

SUMMARY OF THE INVENTION

The present invention is recognized by the following configurations.

A nail design device of the present invention includes: an analyzing unit which derives a feature quantity of a nail based on a shape of the nail from an image including the nail; and a judging unit which judges whether at least one of a plurality of nail designs is suitable for the nail on the basis of a comparison between the feature quantity and design data, the design data being corresponding to the plurality of nail designs.

A nail design method of the present invention includes: an analyzing step of deriving a feature quantity of a nail based on a shape of the nail from an image including the nail; and a judging step of judging whether at least one of a plurality of nail designs is suitable for the nail on the basis of a comparison between the feature quantity and design data, the design data being corresponding to the plurality of nail designs.

A computer-readable recording medium of the present invention stores a nail design program which causes a computer of a nail design device to perform the steps of: deriving a feature quantity of a nail based on a shape of the nail from an image including the nail; and judging whether at least one of a plurality of nail designs is suitable for the nail on the basis of a comparison between the feature quantity and design data, the design data being corresponding to the plurality of nail designs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a table illustrating judgment standard data according to the embodiment;

DETAILED DESCRIPTION OF THE INVENTION

Figure 1:
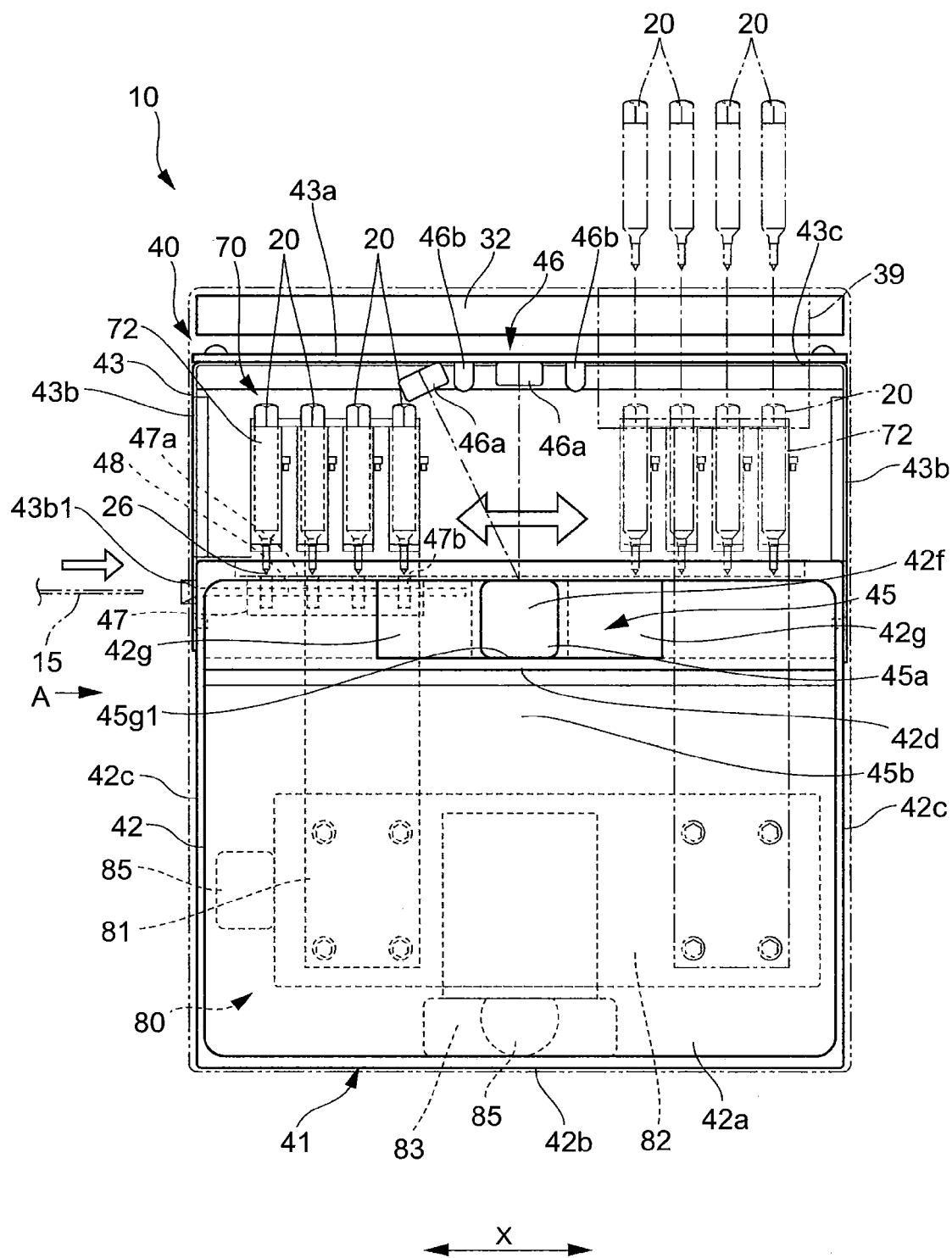
FIG. 1 is a front view of a nail printing apparatus according to an embodiment of the present invention.

A mode for carrying out the present invention (hereinafter, referred to as an "embodiment") will be described below with reference to the accompanying drawings. Throughout the description of the embodiment, the same elements are denoted by the same reference numerals. In the following description, "front" and "rear" refer to the "front side" and "back side", respectively, when facing the nail printing apparatus, and "left" and "right" refer to the "left side" and "right side", respectively, when facing the nail printing apparatus.

Further, in the following embodiment, it is assumed that the nail printing apparatus performs drawing on a surface of a fingernail. The drawing target surface of the present invention, however, is not limited to the surface of a fingernail; it may be, for example, a surface of a toenail.

Configuration of the Embodiment

Figure 2:
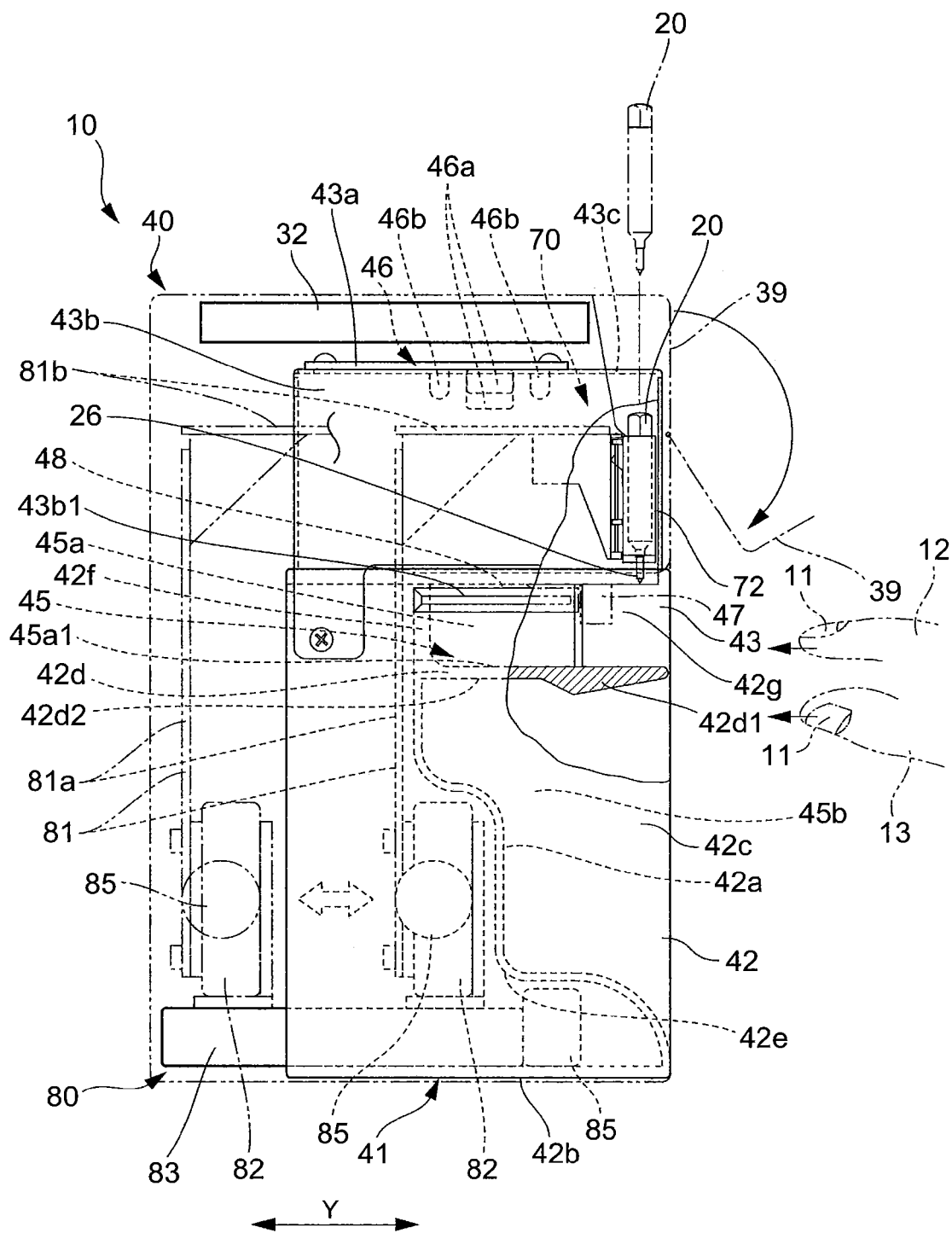
FIG. 2 is a side view, as seen in the direction of an arrow A in FIG. 1, partially in cross section to show the internal structure.
Figure 3:
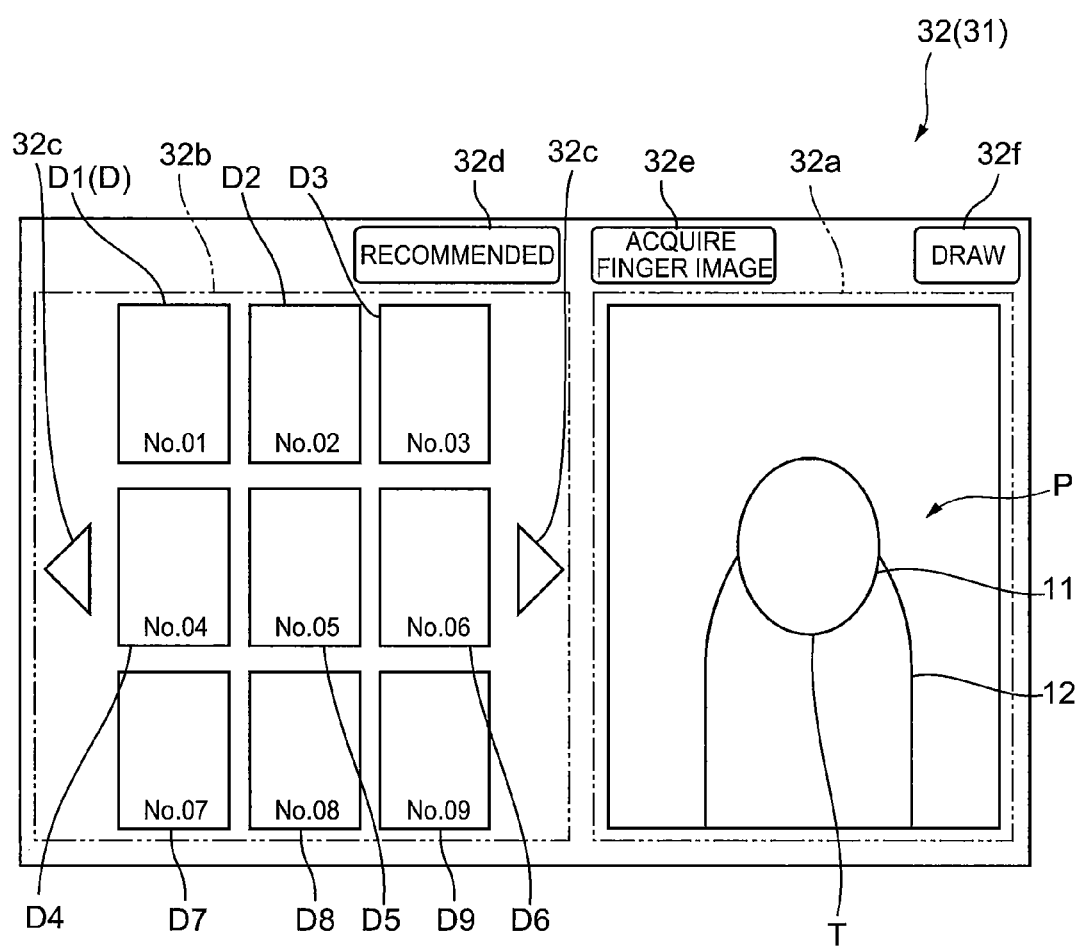
FIG. 3 is a plan view of a display unit according to the embodiment.

The configuration of the nail printing apparatus will be described with reference to FIGS. 1 to 3. FIG. 1 is a front view of the nail printing apparatus, and FIG. 2 is a side view, as seen in the arrow A direction in FIG. 1, partially in cross section to show the internal structure. FIG. 3 is a plan view of a display unit as seen from above.

As shown in FIGS. 1 and 2, the nail printing apparatus 10 is a pen-type plotter which draws a design on a nail 11 of a human finger, and includes a case body 40 and an apparatus body 41 housed in the case body 40. In FIGS. 1 and 2, the case body 40 is shown by two-dot chain lines.

On one side (in this example, on the right side) of the case body 40, a lid 39 is provided which is openable for replacement of pens.

On the upper surface (top board) of the case body 40, a display unit 32 is disposed. In this example, the display unit 32 is a flat-panel display of a certain type, such as a liquid crystal display (LCD) or an organic electroluminescence display. The display unit 32 is of a touch panel type equipped with an operation unit 31, and is capable of accepting user instructions as the user touches the surface of the display unit 32 with a fingertip or with a stylus pen or other pointed wand-type writing tool, for example. The configuration of the display unit 32 will be described in more detail later.

As shown in FIG. 1, the apparatus body 41 has a substantially box shape, and is composed of a lower machine casing 42 and an upper machine casing 43. The lower machine casing 42 is disposed in a front lower part of the case body 40, and the upper machine casing 43 is disposed in a front upper part of the case body 40 and fixed to the lower machine casing 42. In the apparatus body 41, a finger fixation section 45 and an image acquiring unit 46 are provided. The apparatus body 41 further includes: a drawing unit 70 equipped with a pen 20; a movement device 80 which moves the drawing unit 70 in a right-left direction and in a front-rear direction; a cap section 47 for protecting a pen point 26; a pen warm-up section 48 for making the pen 20 ready for drawing; and a control device 51 (see FIG. 4) which controls operations of the units and components. The number of pens 20 installed in the nail printing apparatus 10 (drawing unit 70) is arbitrary; here, four pens 20 are installed by way of example.

The upper machine casing 43 is composed of a substrate 43a, disposed along the lower surface of the display unit 32, and a pair of right and left upper side plates 43b. The upper machine casing 43 has a pen replacement opening 43c at a position corresponding to the lid 39 for pen replacement. For attachment/detachment of a pen 20, the lid 39 for pen replacement can be opened in the state where the drawing unit 70 has been moved to the right side, and the pen 20 can be attached to a pen holder 72 or detached therefrom via the pen replacement opening 43c. In practical use, when a user operates the touch panel type display unit 32 in accordance with the instructions displayed on the display unit 32 to select a design or the like, the user is instructed to insert which color pen 20 into which pen holder 72 (for example, to insert the "No. 2 pen 20" into the "No. 1 pen holder 72").

As shown in FIG. 2, the lower machine casing 42 is composed of a back plate 42a, a bottom plate 42b, a pair of right and left lower side plates 42c, and a dividing wall 42d. The lower side plates 42c have their lower ends joined to the corresponding ends in the right-left direction of the bottom plate 42b. The back plate 42a is joined to the bottom plate 42b and the lower side plates 42c so as to close the rear side of the area surrounded by the bottom plate 42b and the lower side plates 42c. At the lower part of the back plate 42a, a concave section 42e is formed which is concave stepwise toward the front. The dividing wall 42d is provided inside the lower machine casing 42 to partition the inner space of the lower machine casing 42 (surrounded by the back plate 42a, the bottom plate 42b, and the lower side plates 42c) into upper and lower spaces. The dividing wall 42d extends approximately horizontally. The dividing wall 42d has its right and left ends joined to the lower side plates 42c, and has its rear end joined to the back plate 42a.

The finger fixation section 45 is formed integrally with the lower machine casing 42. The finger fixation section 45 has a finger receiving section 45a and a finger escape section 45b partitioned by the dividing wall 42d. The finger receiving section 45a is arranged on the upper side of the dividing wall 42d, approximately in the center in the right-left direction of the lower machine casing 42. The finger receiving section 45a receives a drawing target finger 12 having a nail 11 on which a design is to be drawn. The finger escape section 45b is arranged on the lower side of the dividing wall 42d. A non-drawing-target finger 13 is inserted into the finger escape section 45b.

The finger receiving section 45a opens at the upper front of the lower machine casing 42. A drawing target finger placement section 45a1, constituting a part of the dividing wall 42d, is formed on the lower side of the finger receiving section 45a. On the upper surface of the dividing wall 42d, on both sides at the front surface side of the lower machine casing 42, front walls 42f are provided upright to close the front surface side of the lower machine casing 42. Further, on the upper surface of the dividing wall 42d, a pair of right and left guide walls 42g are provided in such a manner that their width gradually decreases from the front walls 42f toward the finger receiving section 45a. The right and left guide walls 42g have the function of guiding the drawing target finger 12 into the finger receiving section 45a.

In the finger fixation section 45, the user can pinch the dividing wall 42d with the drawing target finger 12 inserted into the finger receiving section 45a and a non-drawing-target finger 13 inserted into the finger escape section 45b. This allows the drawing target finger 12 inserted in the finger receiving section 45a to be fixed stably.

Further, a projection 42d1 is formed to protrude downward at the front part of the dividing wall 42d. In this example, the upper surface of the projection 42d1 extends in the horizontal direction, and the lower surface of the projection 42d1 is a tapered surface that becomes gradually thinner toward the front side. At the rear side of the lower surface of the projection 42d1, a concave section 42d2 is formed which is concaved upward. With such projection 42d1 and concave section 42d2 provided on the dividing wall 42d, when a non-drawing-target finger 13 is inserted into the finger escape section 45b, a space is secured between the nail 11 on which a design has been drawn and the ceiling of the concave section 42d2. This can prevent the nail 11 with the design drawn thereon from coming into contact with the dividing wall 42d, thereby preventing ink from attaching to the apparatus or the picture drawn on the nail 11 from being blurred or damaged.

Returning to FIG. 1, the image acquiring unit 46 is provided in the center on the lower surface of the substrate 43a, and includes a camera 46a and a light 46b. In this example, a plurality of (for example, two) cameras 46a and a plurality of (for example, four) lights 46b are installed. A camera 46a is for photographing a drawing target finger 12 inserted into the finger receiving section 45a and its nail 11. For example, a camera with about two million pixels or more can be used suitably. A plurality of lights 46b are arranged to surround a camera 46a, and illuminate the nail 11 of the drawing target finger 12 when photographing it with the camera 46a. White LEDs, for example, can be suitably used as the lights 46b. Here, the cameras 46a are provided on the lower surface of the substrate 43a, integrally with the nail printing apparatus 10. Alternatively, digital cameras may be prepared separately from the nail printing apparatus 10 and attached to the same positions as the cameras 46a for use.

On the basis of an image of the drawing target finger 12 including the nail 11 (hereinafter, this image will be referred to as the "finger image P") acquired by the cameras 46a, a nail region detecting unit 59 (described later; see FIG. 4) detects information such as the shape of the nail 11, the position of the nail 11 (including the positions in the horizontal and longitudinal directions of the nail 11), and the curvature of the nail 11. The image acquiring unit 46 is connected to and controlled by a photographing control unit 58 (described later; see FIG. 4). Data on the finger image P acquired by photographing by the image acquiring unit 46 is stored in a nail image storage unit 55 (described later; see FIG. 4).

In the image acquiring unit 46, of the plurality of cameras 46a, at least one camera can be arranged right above the finger receiving section 45a so as to photograph the nail 11 from right above, and at least one camera can be arranged displaced from the position right above the finger receiving section 45a so as to photograph the nail 11 from diagonally above. Photographing the nail 11 planarly as well as from diagonally above by the cameras 46a makes it possible to calculate the curvature of the nail 11 more accurately, and suitably draw the design on the nail 11 according to the curved surface thereof.

As shown in FIG. 2, the movement device 80 includes an X stage 82 and a Y stage 83. The X stage 82 moves a carriage 81 supporting the drawing unit 70 in the X direction (right-left direction). The Y stage 83 moves the carriage 81 in the Y direction (front-rear direction). The X stage 82 and the Y stage 83 each include a drive unit 85, made up of a stepping motor, and a ball screw and a guide. The drive unit 85 may be selected from various driving mechanisms including a servo motor besides the stepping motor. It may be of any type as long as it can move the drawing unit 70 as desired. Each of the X stage 82 and the Y stage 83 is not limited to the combination of the stepping motor, ball screw, and guide; it may be a commonly used mechanism composed of a shaft, guide, and wire.

The carriage 81 includes a lower carriage 81a, which extends upward from the X stage 82, and an upper carriage 81b, which extends frontward from the upper end of the lower carriage 81a. The drawing unit 70 is attached to the front end of the upper carriage 81b.

In the nail printing apparatus 10, the carriage 81 can be moved arbitrarily in the X and Y directions by the movement device 80, so a pen 20 in the drawing unit 70 can be moved to an arbitrary position in the X and Y directions, whereby a desired design can be drawn on the nail 11.

Returning to FIG. 1, the cap section 47 is arranged on one of the right and left sides (in this example, on the left side) of the finger receiving section 45a. The cap section 47 includes a cap body 47a and an insertion hole 47b provided at the cap body 47a and opening upward. A pen point 26 of the pen 20 can be inserted into this insertion hole 47b from above. When the nail printing apparatus 10 is not in use, the drawing unit 70 can be moved to the position above the cap section 47 and the pen points 26 of the pens 20 can be inserted into the insertion holes 47b. This can prevent the pen points 26 from drying while not in use. The number of insertion holes 47b may be set arbitrarily in accordance with the number of pens 20 installed in the drawing unit 70. In this example, four insertion holes 47b are arranged side by side corresponding to the four pens 20.

The pen warm-up section 48 is a flat part which is arranged at the rear side of the cap section 47. The upper side plate 43b (in this example, the upper side plate 43b on the left side) is provided with an insertion port 43b1. A drawing medium 15 is inserted through the insertion port 43b1 and placed on the pen warm-up section 48. The drawing medium 15 may be any medium, such as a sheet of paper, as long as it enables warm-up or breaking-in of pen points 26. In this nail printing apparatus 10, warm-up drawing is performed to prevent blurring at the beginning of actual drawing due to drying of a pen point 26 or poor permeation of ink. Specifically, immediately before drawing a design on a nail 11, a pen 20 is lowered to make the pen point 26 come into contact with the drawing medium 15, and caused to draw a prescribed figure such as "○" or "∞". This enables a design to be drawn on a nail 11 using the pen point 26 in good condition. The prescribed figure is not particularly limited, but a simple figure such as "○" or "∞" is suitable so as to avoid waste of ink. It is desirable that the position for drawing the figure such as "○" or "∞" is shifted a little, for each time of warm-up drawing, within the range of the pen warm-up section 48. When the figures have been drawn on almost the entire surface of the drawing medium 15, a message reading "Replace paper", for example, can be displayed on the display unit 32, so that the warm-up drawing can be performed on a new sheet of paper.

As shown in FIG. 3, on the right or left side (in this example, on the right side) of the display unit 32, a design confirmation section 32a is provided in which a finger image P and a nail region T (an outlined image or the like of the nail 11) included in the finger image P can be confirmed. On the other side (in this example, on the left side) of the display unit 32, a design selection section 32b is provided in which a plurality of nail designs D are displayed. In the following description, different nail designs are referred to as "nail design D1", "nail design D2", "nail design D3", etc., with different numbers added behind the character D. The nail designs D1, D2, D3, etc. are collectively referred to as "nail design(s) D", with no number added behind the character D.

The design selection section 32b allows a user to select a nail design D to be drawn on a nail 11, by touching one of the nail designs D being displayed. Triangular buttons 32c are provided on the right and left of the design selection section 32b. The user can press one of the triangular buttons 32c to cause another nail design D, not displayed yet, to appear on the design selection section 32b.

The display unit 32 further includes a recommend button 32d for causing a nail design D that is suited to be drawn on a nail 11 to be displayed on the design selection section 32b, a finger image acquisition button 32e for acquiring a finger image P, and a drawing button 32f for drawing the selected nail design D on the nail 11.

Figure 4:
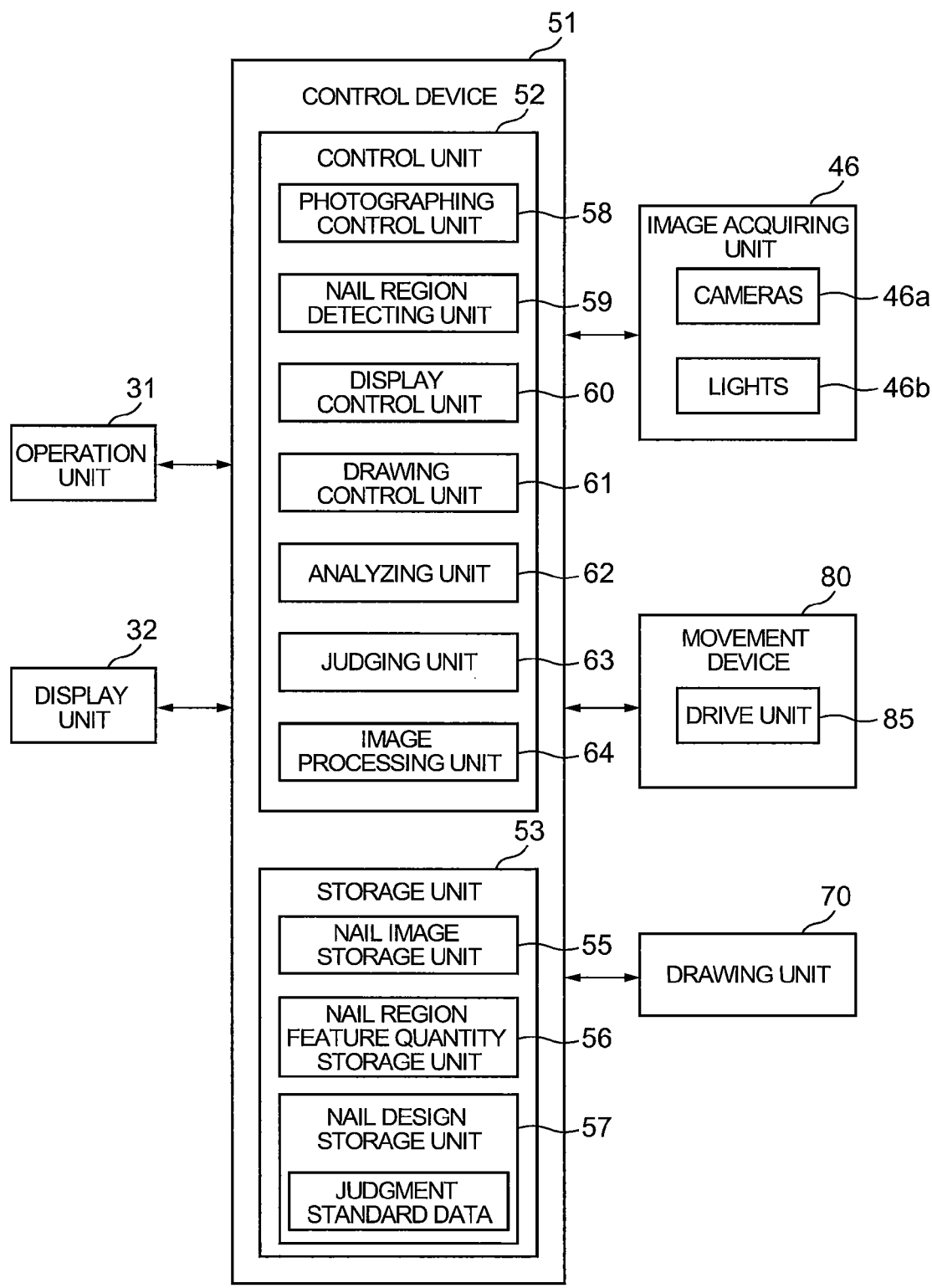
FIG. 4 is a block diagram showing the control configuration according to the embodiment.

FIG. 4 is a block diagram showing the control configuration of the nail printing apparatus 10 according to the present invention.

As shown in FIG. 4, the control device 51 includes a control unit 52 configured with a central processing unit (CPU), and a storage unit 53 configured with a read only memory (ROM), a random access memory (RAM), and the like.

The control unit 52 includes a photographing control unit 58, a nail region detecting unit 59, a display control unit 60, a drawing control unit 61, an analyzing unit 62, a judging unit 63, and an image processing unit 64. The functions of the photographing control unit 58, the nail region detecting unit 59, the display control unit 60, the drawing control unit 61, the analyzing unit 62, the judging unit 63, and the image processing unit 64 are implemented by cooperation of the CPU of the control unit 52 and the programs stored in the ROM of the storage unit 53.

The storage unit 53 stores various programs and various data for operating the nail printing apparatus 10. The ROM (i.e. the computer-readable recording medium) of the storage unit 53 stores various programs including a program (corresponding to the "nail design program" of the present invention) which implements at least the following functions: the function of causing the cameras 46a in the image acquiring unit 46 to photograph a drawing target finger 12; the function of causing the analyzing unit 62 to analyze the shape of the nail region T to thereby obtain a feature quantity (described later) of the nail 11; and the function of causing the judging unit 63 to judge whether the obtained feature quantity conforms to judgment standard data (described later) used for judging whether the nail design D is suited to be drawn on the nail 11. The programs are executed by the control device 51 (i.e. the computer) to comprehensively control the units and components of the nail printing apparatus 10.

The storage unit 53 includes: a nail image storage unit 55 in which the nail region T of the user, acquired by the image acquiring unit 46, is stored; a nail region feature quantity storage unit 56 in which the feature quantity derived by the analyzing unit 62 is stored; and a nail design storage unit 57 in which design data corresponding to a plurality of nail designs D having judgment standard data is stored.

The feature quantity of a nail 11 and the judgment standard data will now be described with reference to FIGS. 5 and 6.

Figure 5:
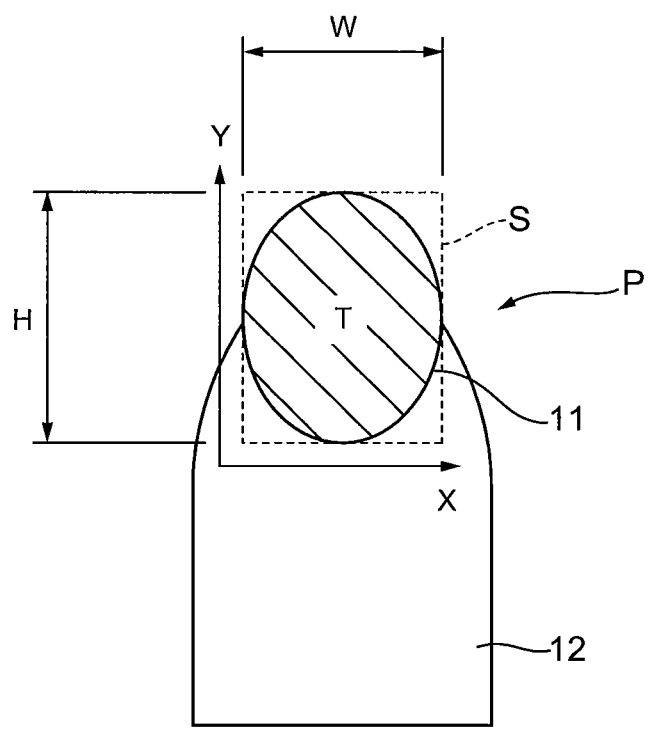
FIG. 5 is a plan view of a finger image illustrating feature quantities according to the embodiment.

FIG. 5 is a plan view of a finger image illustrating feature quantities of a nail. FIG. 6 is a table illustrating the judgment standard data.

As shown in FIG. 5, the feature quantities of a nail include: a length H of the nail 11 in the longitudinal direction of the drawing target finger 12; an aspect ratio (H/W) of the nail 11 obtained by dividing the length H of the nail 11 by a width W of the nail 11 in the direction orthogonal to the longitudinal direction of the drawing target finger 12; and an area rate R of the nail 11 obtained by dividing the area of the nail region T (area of the portion shown by hatching in FIG. 5) by the area of a circumscribed quadrangle S (shown by a dotted line in FIG. 5) surrounding the nail 11 along the longitudinal direction and the width direction of the nail 11.

When the width direction of the nail 11 corresponds to the X axis and the length direction of the finger corresponds to the Y axis, the length H of the nail 11 is obtained by "(maximal value of the Y coordinate of the nail region T−minimal value of the Y coordinate of the nail region T)". The aspect ratio (H/W) of the nail 11 is obtained by "(maximal value of the Y coordinate of the nail region T−minimal value of the Y coordinate of the nail region T)/(maximal value of the X coordinate of the nail region T−minimal value of the X coordinate of the nail region T)". Further, the area rate R is obtained by "area of the nail region T/{(maximal value of the Y coordinate of the nail region T−minimal value of the Y coordinate of the nail region T)×(maximal value of the X coordinate of the nail region T−minimal value of the X coordinate of the nail region T)}". The area rate R is an indication of how close to a quadrangle the nail region T is.

As shown in FIG. 6, the judgment standard data is included in design data corresponding to respective nail designs D. The judgment standard data shows the ranges of the length H, aspect ratio (H/W), and area rate R of the nail 11 appropriate for the design data corresponding to each nail design D. For example, the design data corresponding to the No. 01 nail design D1 has the judgment standard data indicating the conformity conditions that the aspect ratio (H/W) of the nail 11 should be 1.0 or more and the area rate R should be 80% or more, although the length H of the nail 11 is arbitrary (shown as "ALL" in the figure). The design data corresponding to the No. 02 nail design D2 has the judgment standard data indicating that the aspect ratio (H/W) of the nail 11, the length H of the nail 11, and the area rate R are all arbitrary. The design data corresponding to the No. 03 nail design D3 has the judgment standard data indicating the conformity conditions that the aspect ratio (H/W) of the nail 11 should be 1.0 or less and the length H of the nail 11 should be 5 mm or longer, although the area rate R is arbitrary.

Returning to FIG. 4, the photographing control unit 58 controls the cameras 46a and the lights 46b of the image acquiring unit 46 to cause the cameras 46a to photograph a drawing target finger 12 inserted in the finger receiving section 45a, thereby acquiring a finger image P including the nail 11.

The nail region detecting unit 59 detects the nail region T on the basis of the finger image P of the finger inserted into the finger receiving section 45a, taken with the cameras 46a.

The display control unit 60 controls the display unit 32 to display various screens on the display unit 32. The display control unit 60 causes various display screens, including the design selection section 32b, the design confirmation section 32a, the finger image P, and the nail region T, and various buttons, including the recommend button 32d, the finger image acquisition button 32e, and the drawing button 32f, to be displayed on the display unit 32.

The drawing control unit 61 outputs drawing data, generated by the image processing unit 64, to the movement device 80 and the drawing unit 70, and controls the operations of the drive unit 85 of the movement device 80 and the drawing unit 70 to thereby cause the pens 20 to perform drawing on the nail 11 in accordance with the drawing data.

The analyzing unit 62 analyzes the nail region T to obtain the feature quantity of the nail 11. More specifically, the length H, the aspect ratio (H/W), and the area rate R of the nail 11 are obtained from the nail region T photographed by the cameras 46a of the image acquiring unit 46. In obtaining the length H of the nail 11, the analyzing unit 62 determines the X and Y axes, on the basis of the state of the drawing target finger 12 acquired when photographing the nail 11, in such a manner that the direction in which the drawing target finger 12 extends is defined as the Y axis (see FIG. 5) and the direction orthogonal to the direction of the Y axis thus defined is defined as the X axis (see FIG. 5).

The judging unit 63 judges whether the feature quantity of the nail 11 obtained in the analyzing unit 62 conforms to the judgment standard data. On the basis of the judgment made by the judging unit 63, the display control unit 60 shows to the user any nail design D having the judgment standard data fit for his/her nail 11, in the design selection section 32b on the display unit 32.

The image processing unit 64 generates drawing data by scaling the nail design D selected by the user to match the size of the nail region T in the finger image P.

Operations of the Embodiment

Figure 7:
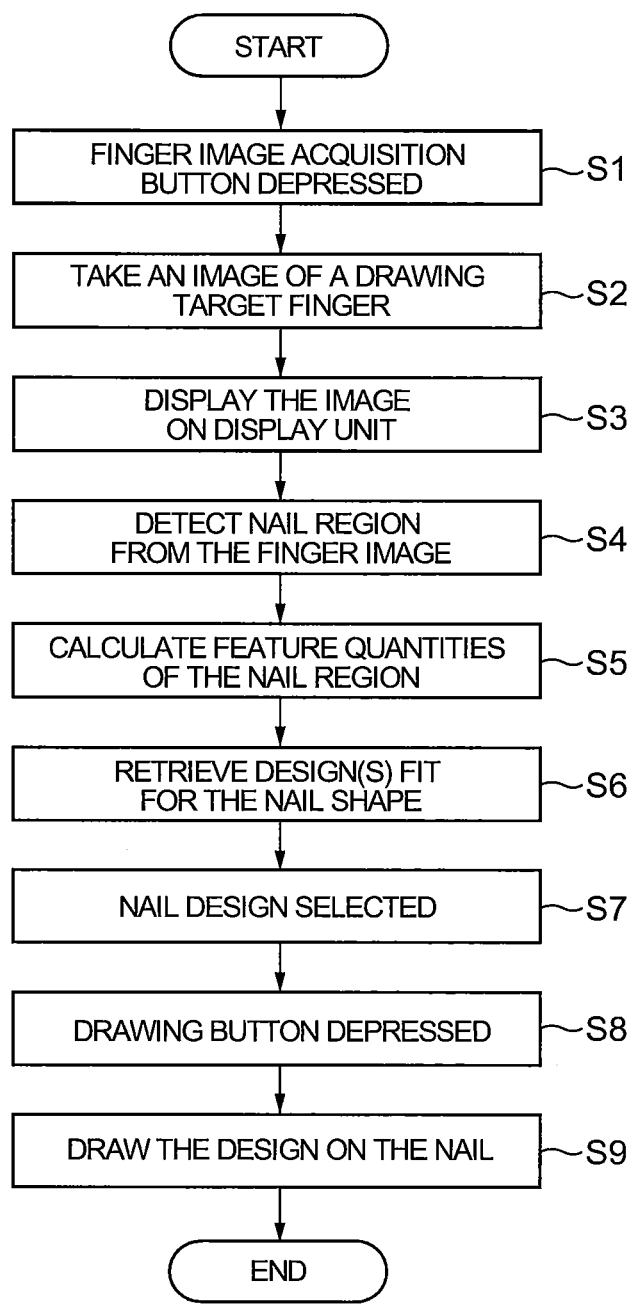
FIG. 7 is a flowchart illustrating an operation of the nail printing apparatus according to the embodiment.
Figure 8:
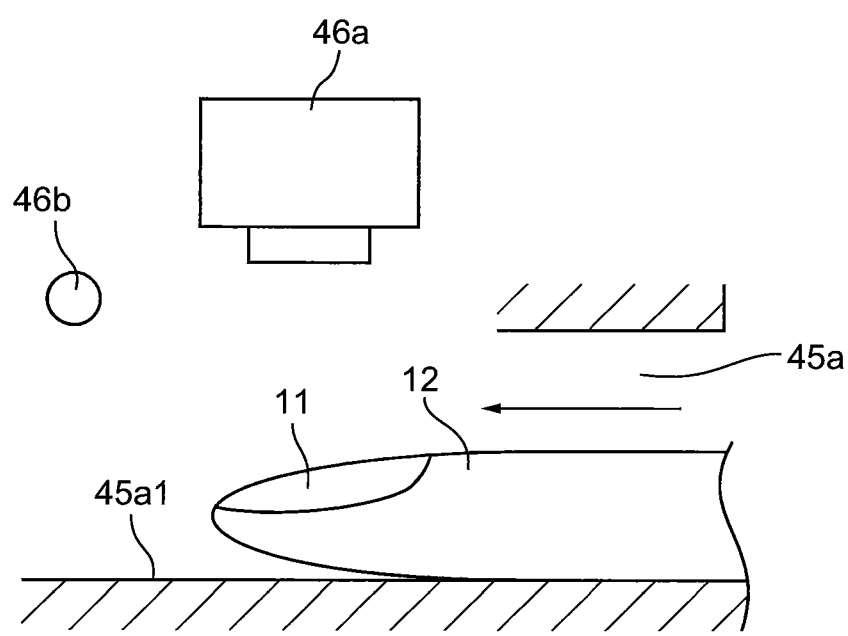
FIG. 8 is a schematic side sectional view of a finger receiving section and its surroundings according to the embodiment.
Figure 9:
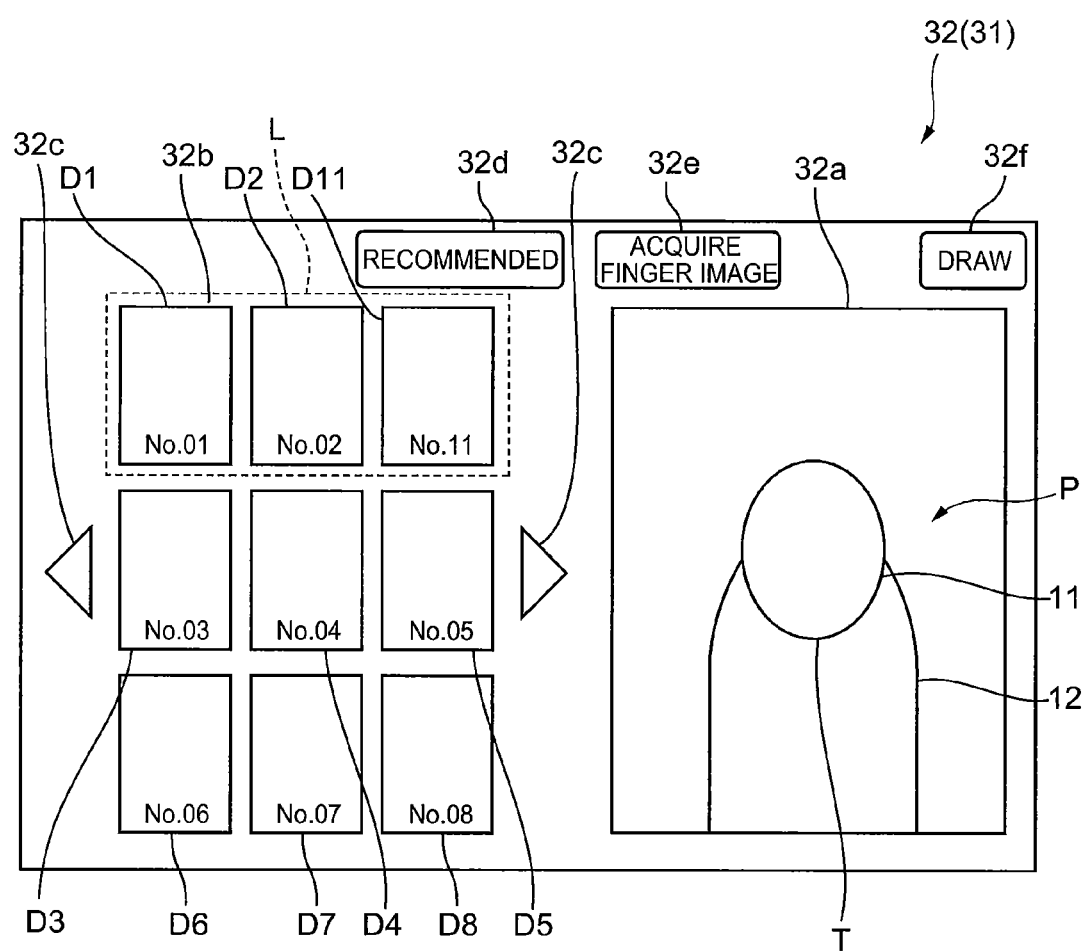
FIG. 9 shows, by way of example, a selection screen displayed on the display unit according to the embodiment.

A method for forming a nail design D on a nail 11 using the nail printing apparatus 10 will now be described with reference to FIGS. 7 to 9. FIG. 7 is a flowchart illustrating the operations of the nail printing apparatus. FIG. 8 is a schematic side sectional view of the finger receiving section and its surroundings. FIG. 9 shows, by way of example, a selection screen displayed on the display unit.

As shown in FIG. 7, first, in step S1, a user depresses the finger image acquisition button 32*e* on the display unit 32. More specifically, the user inserts a drawing target finger 12 from the front opening of the finger receiving section 45*a* and places the finger on the drawing target finger placement section 45*a*1 (see FIG. 8), and depresses the finger image acquisition button 32*e* using the other hand. Then, in step S2, a finger image P is photographed by the cameras 46*a*. This step S2 corresponds to the "photographing step" of the present invention.

Next, in step S3, the display control unit 60 causes the finger image P to be displayed on the design confirmation section 32*a* (see FIG. 3) of the display unit 32. In step S4, the nail region detecting unit 59 detects the nail region T by subjecting the acquired finger image P to edge detecting processing and the like. Then, in step S5, the analyzing unit 62 calculates the length H, the aspect ratio (H/W), and the area rate R of the nail 11, as the feature quantities of the nail region T. This step S5 corresponds to the "analyzing step" of the present invention.

Next, in step S6, any nail design D that fits the shape of the nail 11 is retrieved by judgment. That is, the judging unit 63 compares the calculated feature quantities of the nail region T with the information included in the design data corresponding to the respective nail designs D, to see whether the feature quantities of the nail region T conform to the judgment standard data of the respective nail designs D. For example, in the case of a nail 11 having the aspect ratio (H/W) of 1.2 and the area rate R of 85%, it is judged on the basis of the judgment standard data (see FIG. 6) that the No. 01 nail design D1 and the No. 02 nail design D2 are designs which nicely fit the nail 11. At this time, when the user instructs to display any nail designs D fit for the nail 11 on the design selection section 32*b*, the display control unit 60 displays the nail designs (fitting nail designs) D judged to fit the nail 11, on the design selection section 32*b*. For example, with depression of the recommend button 32*d* (see FIG. 3), the plurality of nail designs D displayed on the design selection section 32*b* can be sorted and reordered in accordance with the congeniality to the nail 11. More specifically, the nail designs (fitting nail designs) D1, D2, and D11 judged to fit the nail 11 can be highlighted in the design selection section 32*b*. (For example, those designs may be displayed on the upper part of the design selection section 32*b* and surrounded by a line L, as shown in FIG. 9.) The way of displaying the nail designs D fit for the nail 11 is arbitrary; only the nail designs D1, D2, and D11 judged to fit the nail 11 may be displayed in the design selection section 32*b*. The step S6 corresponds to the "judging step" of the present invention.

Next, in step S7, the user selects, from among the plurality of nail designs D (for example, the nail designs D1, D2 etc. shown in FIG. 9) displayed in the design selection section 32*b*, the nail design D that the user wishes to be drawn on his/her nail, by touching the design on the design selection section 32*b*. When one of the nail designs D is selected by the user, the selected nail design D is set as the design to be drawn on the nail 11. The nail design D thus set is scaled to match the size of the nail region T by the image processing unit 64, and the resultant design is displayed in the design confirmation section 32*a* so as to be overlaid on the finger image P by the display control unit 60. This allows the user to imagine the state after the design is drawn on the nail 11.

Next, in step S8, the drawing button 32*f* (see FIG. 9) on the display unit 32 is depressed. Then, in step S9, the drawing control unit 61 causes the drawing unit 70 to start drawing on the nail 11. Once the drawing of the set nail design D onto the nail 11 has been completed, the series of processing is finished.

According to the embodiment described above, the feature quantity of the nail 11 of the user is obtained by analyzing the shape of the nail 11 and, on the basis of the feature quantity, any nail design well suited to the shape of the nail 11 is judged from among a plurality of nail designs D. The one or more nail designs fit for the shape of the nail 11 are presented to the user. This allows the user to more easily select the nail design that fits the shape of the nail 11 from among a plurality of nail designs. The nail design thus selected can be suitably drawn on the nail 11.

Although several embodiments of the present invention have been described, the invention is not limited to the above-described embodiments but covers the scope of the claims and their equivalents.

What is claimed is:

1. A nail design device comprising:
   a processor configured to:
   derive a feature quantity of a nail based on a shape of the nail from an image including the nail; and
   judge whether at least one of a plurality of nail designs is suitable for the nail on the basis of a comparison between the feature quantity and design data, wherein the design data corresponds to the plurality of nail designs,
   wherein the feature quantity comprises a length of the nail in a longitudinal direction of a finger including the nail, an aspect ratio of the nail obtained by dividing the length of the nail by a width of the nail in a width direction orthogonal to the longitudinal direction, and an area rate of the nail obtained by dividing an area of the nail by an area of a circumscribed quadrangle surrounding the nail along the longitudinal direction and the width direction.

2. The nail design device according to claim 1,
   wherein the processor is configured to cause the at least one of the plurality of nail designs to be displayed on a display.

3. The nail design device according to claim 2,
   wherein the processor is configured to cause at least one of the plurality of nail designs that has been judged to be suitable for the nail to be displayed on the display as a fitting nail design in a highlighted manner that is visually different from the others of the plurality of nail designs.

4. The nail design device according to claim 3,
   wherein the processor is configured to cause only the fitting nail design of the plurality of nail designs to be displayed on the display.

5. The nail design device according to claim 1,
   wherein the processor is configured to control a camera to acquire the image including the nail by photographing the finger including the nail.

6. The nail design device according to claim 1,
wherein the design data includes data of the length, the aspect ratio, and the area rate of the nail appropriate for drawing each of the plurality of nail designs.

7. A nail design device comprising:
a processor configured to:
derive a feature quantity of a nail based on a shape of the nail from an image including the nail;
judge whether at least one of a plurality of nail designs is suitable for the nail on the basis of a comparison between the feature quantity and design data, wherein the design data corresponds to the plurality of nail designs; and
cause at least one of the plurality of nail designs that has been judged to be suitable for the nail to be displayed on a display as a fitting nail design in a highlighted manner, wherein according to the highlighted manner of display, the order of displaying each of the plurality of nail designs on the display is controlled such that the fitting nail design is displayed in higher display order than the nail designs other than the fitting nail design.

8. A nail printing apparatus comprising:
the nail design device according to claim 3;
a driving mechanism; and
one or more pens,
wherein the processor is configured to:
receive a selection of a specific nail design to be drawn on the nail from among the one or more fitting nail designs displayed on the display; and
control the driving mechanism to move the one or more pens to draw the specific nail design selected on the nail.

9. A nail design method comprising:
deriving a feature quantity of a nail based on a shape of the nail from an image including the nail; and
judging whether at least one of a plurality of nail designs is suitable for the nail on the basis of a comparison between the feature quantity and design data, wherein the design data corresponds to the plurality of nail designs,
wherein the feature quantity comprises a length of the nail in a longitudinal direction of a finger including the nail, an aspect ratio of the nail obtained by dividing the length of the nail by a width of the nail in a width direction orthogonal to the longitudinal direction, and an area rate of the nail obtained by dividing an area of the nail by an area of a circumscribed quadrangle surrounding the nail along the longitudinal direction and the width direction.

10. The nail design method according to claim 9, further comprising:
causing at least one of the plurality of nail designs that has been judged to be suitable for the nail to be displayed on a display as a fitting nail design.

11. The nail design method according to claim 10, further comprising:
receiving a selection of a specific nail design to be drawn on the nail from among the one or more fitting nail designs displayed on the display.

12. The nail design method according to claim 11, further comprising:
controlling a drive mechanism to move one or more pens to draw the specific nail design selected on the nail.

13. The nail design method according to claim 9,
wherein the design data includes data of the length, the aspect ratio, and the area rate of the nail appropriate for drawing each of the plurality of nail designs.

14. A non-transitory computer-readable recording medium storing a nail design program, the program causing a computer of a nail design device to perform:
deriving a feature quantity of a nail based on a shape of the nail from an image including the nail; and
judging whether at least one of a plurality of nail designs is suitable for the nail on the basis of a comparison between the feature quantity and design data, wherein the design data corresponds to the plurality of nail designs,
wherein the feature quantity comprises a length of the nail in a longitudinal direction of a finger including the nail, an aspect ratio of the nail obtained by dividing the length of the nail by a width of the nail in a width direction orthogonal to the longitudinal direction, and an area rate of the nail obtained by dividing an area of the nail by an area of a circumscribed quadrangle surrounding the nail along the longitudinal direction and the width direction.

15. The non-transitory computer-readable recording medium according to claim 14,
wherein the program further causes the computer to perform:
causing at least one of the plurality of nail designs that has been judged to be suitable for the nail to be displayed on a display as a fitting nail design.

16. The non-transitory computer-readable recording medium according to claim 15,
wherein the program further causes the computer to perform:
receiving a selection of a specific nail design to be drawn on the nail from among the one or more fitting nail designs displayed on the display; and
controlling a driving mechanism to move one or more pens to draw the specific nail design selected on the nail.

17. The non-transitory computer-readable recording medium according to claim 14,
wherein the design data includes data of the length, the aspect ratio, and the area rate of the nail appropriate for drawing each of the plurality of nail designs.

* * * * *